US010747217B1

(12) United States Patent
Koenck et al.

(10) Patent No.: US 10,747,217 B1
(45) Date of Patent: Aug. 18, 2020

(54) DISTRIBUTED DIRECTIONAL ANTENNA

(71) Applicant: Rockwell Collins, Inc., Cedar Rapids, IA (US)

(72) Inventors: Steven E. Koenck, Cedar Rapids, IA (US); Anders P. Walker, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 294 days.

(21) Appl. No.: 15/456,232

(22) Filed: Mar. 10, 2017

(51) Int. Cl.
*G05D 1/00* (2006.01)
*H01Q 1/28* (2006.01)
*H04W 4/02* (2018.01)
*G01S 19/25* (2010.01)
*B64C 39/02* (2006.01)
*H04W 4/40* (2018.01)
*H04L 29/08* (2006.01)

(52) U.S. Cl.
CPC ......... *G05D 1/0027* (2013.01); *B64C 39/024* (2013.01); *G01S 19/25* (2013.01); *G05D 1/0022* (2013.01); *H01Q 1/28* (2013.01); *H04W 4/026* (2013.01); *H04W 4/40* (2018.02); *B64C 2201/021* (2013.01); *B64C 2201/146* (2013.01); *H04L 67/12* (2013.01)

(58) Field of Classification Search
CPC .. G05D 1/0027; G05D 1/0022; B64C 39/024; B64C 2201/021; B64C 2201/146; G01S 19/25; H01Q 1/28; H04W 4/026; H04W 4/046; H04W 4/40; H04L 67/12
See application file for complete search history.

(56) References Cited

U.S. PATENT DOCUMENTS

| 6,055,425 A * | 4/2000 | Sinivaara | H04B 7/18508 370/310 |
| 7,760,585 B1 * | 7/2010 | Ortiz | H04B 3/36 367/2 |
| 7,777,674 B1 * | 8/2010 | Haddadin | H01Q 1/28 342/368 |
| 10,067,172 B1 * | 9/2018 | Sternowski | G01R 29/10 |

(Continued)

OTHER PUBLICATIONS

Garza et al., Design of UAVs-Based 3D Antenna Arrays for a Maximum Performance in Terms of Directivity and SLL, Aug. 2016, Hindawi Publishing Corporation, International Journal of Antennas and Propagation, 8 pages (Year: 2016).*

(Continued)

*Primary Examiner* — Sze-Hon Kong
(74) *Attorney, Agent, or Firm* — Suiter Swantz pc llo

(57) ABSTRACT

A group or swarm of vehicles may be configured to move together in a predetermined formation. Each vehicle may include a navigation and communication system configured to provide communication and to determine accurate relative position, navigation, and time information for each vehicle in the group. Each vehicle may include a second radio frequency transceiver configured to receive and transmit in the high frequency (HF) or lower radio frequency band, and to measure and control the timing of the reception and transmission of the HF signals in relation to the timing of the reception and transmission of the HF signals with the other vehicles in the group to form an antenna propagation pattern to communicate over beyond line-of-sight distances.

20 Claims, 10 Drawing Sheets

(56) References Cited

U.S. PATENT DOCUMENTS

| | | | |
|---|---|---|---|
| 2011/0062955 A1* | 3/2011 | Miller | G01R 33/18 324/249 |
| 2014/0269864 A1* | 9/2014 | Aparin | H04B 1/40 375/221 |
| 2014/0301494 A1* | 10/2014 | Hsu | H04B 7/026 375/267 |
| 2015/0135822 A1* | 5/2015 | Waddington | G01P 5/24 73/170.02 |
| 2016/0119798 A1* | 4/2016 | Gil | H04W 24/02 370/252 |
| 2016/0380357 A1* | 12/2016 | Keller | H01Q 11/02 343/731 |
| 2016/0381596 A1* | 12/2016 | Hu | H04B 7/0617 370/236 |
| 2017/0126308 A1* | 5/2017 | Astrom | H04B 7/18506 |
| 2017/0131727 A1* | 5/2017 | Kurdi | G06Q 10/06311 |
| 2017/0235316 A1* | 8/2017 | Shattil | B64C 39/024 701/3 |
| 2018/0115070 A1* | 4/2018 | Wang | H01Q 1/52 |
| 2019/0354117 A1* | 11/2019 | Sakaguchi | B64C 39/024 |

OTHER PUBLICATIONS

Breheny et al., Using Airborne Vehicle-Based Antenna Arrays to Improve Communications with UAV Clusters, Dec. 2003, Proceedings of the 42nd IEEE Conference on Decision and Control, pp. 4158-4162 (Year: 2003).*

Zhi Yao et al., Bulk Acoustic Wave-Mediated Multiferroic Antennas: Architecture and Performance Bound, IEEE Transactions on Antennas and Propagation, vol. 63, No. 8, Aug. 2015, pp. 3335-3344.

* cited by examiner

DISTRIBUTED DIRECTIONAL ANTENNA

INCORPORATION BY REFERENCE

This application relates to U.S. Pat. No. 8,725,400 incorporated herein by this reference in its entirety.

BACKGROUND

Embodiments of the inventive concepts disclosed herein are generally directed to communication systems and methods for unmanned aerial vehicles.

Unmanned aerial vehicles (UAVs) have rapidly matured in recent years from the relatively simple remote controlled airplanes of the past to sophisticated autonomous aircraft that are capable of performing important civilian and military operations and missions. Applications may include but are not limited to aerial surveying, area surveillance, crop monitoring, search and rescue operations, border monitoring, and the like. UAV platforms may range from relatively small hobby class vehicles such as so-called quad-copters equipped with digital cameras that are capable of 10 to 30 minutes of flight time when powered by a battery, to relatively large aircraft such as the Northrop Grumman RQ-4 Global Hawk, which is powered by a jet engine and has endurance of up to 32 hours or more. Interest has recently been growing in the area of groups or swarms of UAVs operating in close proximity to one another to conduct various operations and missions. A group of UAVs flying in a close proximity formation may be capable of performing certain operations that would be difficult or impossible for a single aircraft or UAV to achieve. Examples include terrain mapping, wide angle area surveillance, or flying through hazardous conditions where some number of the UAVs may be lost or damaged by adverse weather conditions, encounters with terrain or vegetation, or opposing forces. In such instances, it may be desirable to configure a plurality (or a swarm) of small UAVs operating together to make loss or attrition of one or more of the UAVs in the swarm less likely to jeopardize the outcome of the objective, and to reduce the total cost to execute the objective.

Some civilian and military operations or missions may need to be conducted at beyond line-of-sight (BLOS) distances far away from any remote control or communication station. BLOS communication may be accomplished by using either satellite communications or the high frequency (HF) band in the frequency range of 3 MHz to 30 MHz. For large UAVs such as the RQ-4 Global Hawk, the aircraft is large enough to accommodate a satellite communication antenna on board, which makes it possible to communicate over BLOS distances from the controlling communication station. With small UAVs such as the type that might be deployed as a group or swarm, satellite communication antennas are too large to be practical at present. Radio waves in the HF band may be reflected back to earth by the ionosphere layer in the atmosphere, which makes BLOS communication across intercontinental distances possible. Unfortunately, HF antennas are also too large at present to be used with small UAVs.

SUMMARY

In one aspect, embodiments of the inventive concepts disclosed herein are directed to a navigation and communication system and method for a group or swarm of UAVs flying in formation. A navigation and communication system may be configured to provide communication and to determine accurate relative position, navigation, and time information for each UAV in the group. The navigation and communication system may be configured as a mesh network to communicate the position, navigation, and time information for each UAV with other UAVs in the group. The navigation and communication system may also be operatively coupled with a flight control processor associated with each UAV to accurately indicate the position of each UAV and to control the flight path of each UAV to fly according to a predetermined formation.

In a further aspect, embodiments of the inventive concepts disclosed herein are directed to a system and method for BLOS communication from a group or swarm of small UAVs. Each UAV may be configured with a receiver/transmitter element operatively coupled to a radio frequency transceiver. The radio frequency transceiver may be configured to receive and transmit in the HF or lower frequency band, and to measure and control the timing of the reception and transmission of the radio frequency (RF) signals in relation to the timing of the reception and transmission of the RF signals with the other UAVs in the group. A controller may be configured with a processor coupled with non-transitory processor-readable medium storing processor-executable code that is operatively coupled with the communication and navigation system, and may use the position and time information associated with each UAV in the group to coordinate the timing of the reception and transmission of the RF signals to and from each UAV to form an antenna propagation pattern that may provide improved communication characteristics in one or more predetermined directions. The improved communication characteristics may include effective antenna gain in one or more predetermined directions to make it possible to communicate over long distances with reduced transmission power. The improved communication characteristics may also include reduced antenna gain in one or more predetermined directions to minimize the deleterious effects of interfering RF signals on the receiver.

In a further aspect, embodiments of the inventive concepts disclosed herein are directed to BLOS communication to and from a group of small UAVs flying in formation using magnetic compass direction or global positioning satellite (GPS) location sensing and a radio frequency communication link to accurately measure the azimuth orientation of the group. Each UAV may be configured with a receiver/transmitter element operatively coupled to a radio frequency transceiver. The radio frequency transceiver may be configured to receive and transmit in the HF or lower frequency band, and to measure and control the timing of the reception and transmission of the radio frequency (RF) signals in relation to the timing of the reception and transmission of the RF signals with the other UAVs in the group. A controller may be configured with a processor coupled with non-transitory processor-readable medium storing processor-executable code that is operatively coupled with the communication and navigation system, and may use the position and time information associated with each UAV in the group to coordinate the timing of the reception and transmission of the RF signals to and from each UAV to form an antenna propagation pattern that may provide improved communication characteristics in one or more predetermined directions.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
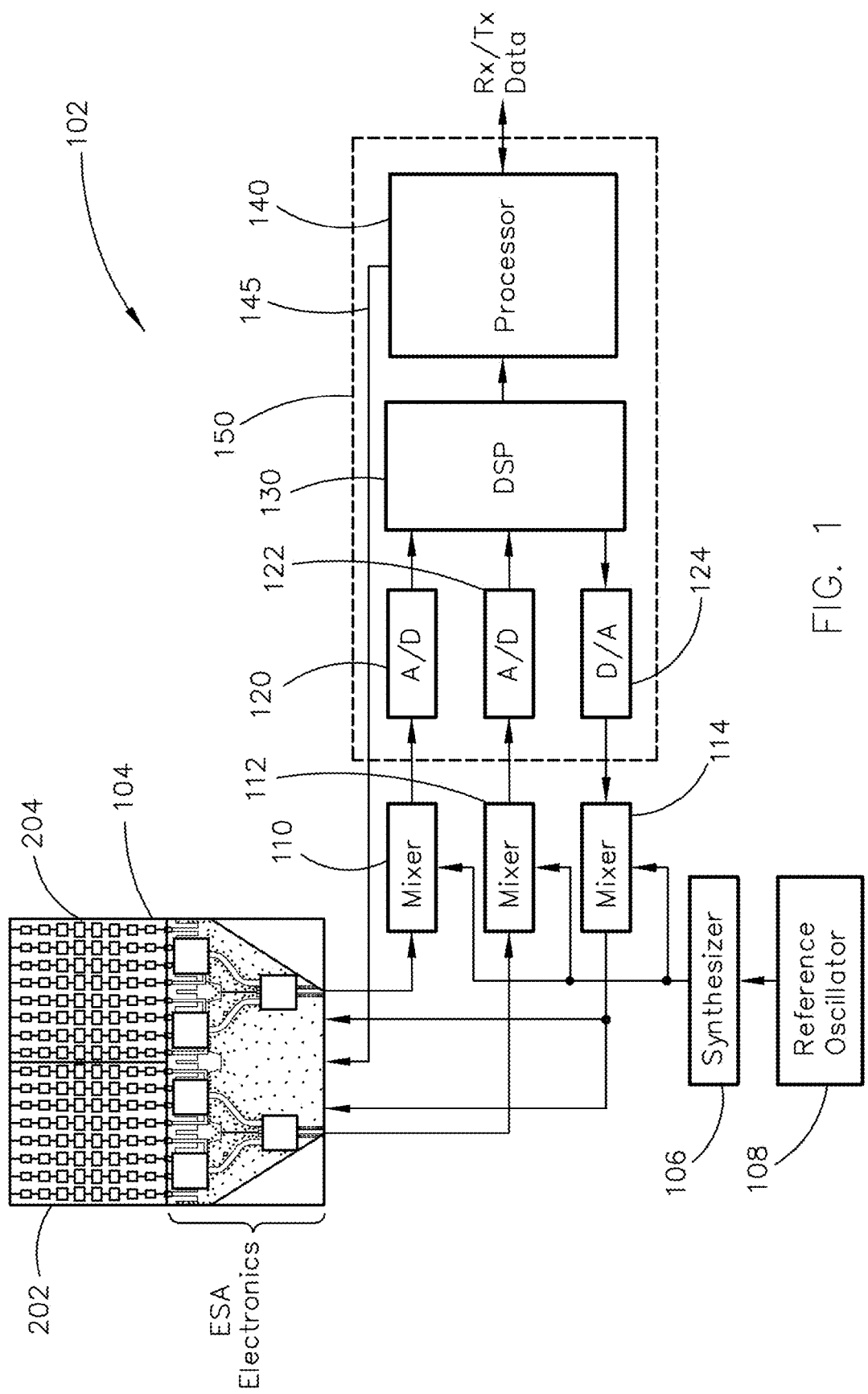
FIG. 1 is a block diagram of an exemplary embodiment of a multi-function data link.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to BLOS communication to and from a group of small UAVs.

Referring now to FIG. 1, a block diagram of an embodiment of a multi-function data link transceiver 102 is shown. The transceiver 102 may include an antenna 104, mixers 110, 112 and 114, a frequency synthesizer 106, a reference oscillator 108, analog to digital (A/D) converters 120 and 122, a digital to analog converter (D/A) 124, a digital signal processor (DSP) 130, and a processor 140. In some embodiments, the transceiver 102 may operate in millimeter-wave frequency bands such as 35-39 GHz, 45-49 GHz, or 57-66 GHz.

Communication in millimeter-wave frequency bands may require high gain directional antennas to achieve sufficient communication range. In some embodiments, an electrically steerable antenna (ESA) comprising a plurality of receiving and transmitting elements configured to operate in phased relationship with one another may provide antenna gain in a predetermined spatial direction. The antenna pattern or beam may be directed in a single direction such as horizontal or vertical, or the pattern or beam may be directed in both the horizontal and vertical directions. The ESA may include radio frequency receive and transmit electronic components implemented as radio frequency integrated circuits (RFICs). One or more RFICs may be operatively coupled to each ESA receiving and transmitting element, and may be configured to control the phase relationship of the signals received and transmitted by each ESA element. The values of the phase to be controlled for each ESA element may be computed by the processor 140, or they may be computed in advance and may be stored in an on-board code book memory and retrieved as needed to configure the time or phase controls for each element of the antenna 104 to steer the directional antenna pattern in the desired direction. The steering behavior of the antenna 104 may be controlled by a digital interface 145 from the processor 140 to a digital control input of the antenna 104. In some embodiments, a Serial Peripheral Interface (SPI) standard interface may be used for digital communication between the processor 140 and the antenna steering components of the antenna 104.

In some embodiments, the antenna 104 may be configured to provide beam steering in the horizontal direction, and may be configured with two arrays, portions, or zones with an independent receive channel operatively coupled to each portion. A first array 204 of the antenna 104 may be operatively coupled with the mixer 110, and a second array 202 of the antenna 104 may be operatively coupled with the mixer 112. The mixers 110 and 112 may be driven by a frequency synthesizer 106, which may generate a tuning frequency from the reference oscillator 108. The mixers 110 and 112 coherently convert the RF signals to baseband signals that may be operatively coupled to the A/D converters 120 and 122. The outputs of the A/D converters 120 and 122 may be operatively coupled to the DSP 130, which may perform filtering, demodulation, and other signal processing operations associated with receiving a data link transmission.

The DSP 130 may simultaneously receive signals from both the first array and the second array of the antenna 104. After filtering and demodulating the two sets of signals, the DSP 130 may compare the relative time of arrival of the first array signal with respect to time of arrival of the second array signal, and may use this information to determine the angle of arrival of the RF signal that originated from a transmitter.

The multi-function data link transceiver 102 may also transmit information in the millimeter-wave frequency bands that it uses to receive information. The transmit function may comprise a portion of the DSP 130 for signal processing, modulation and filtering, the D/A converter 124, the up-converting mixer 114, and the transmit portion of the ESA 104. Selection of the ESA steering angle may be performed similarly to the receive function by either onboard computation or precomputation and storage in a code book memory.

The DSP 130 may measure the time required for a round-trip transmission and reception of communications with a remote multi-function data link transceiver assembly to determine the distance to the remote transceiver from the multi-function data link transceiver 102. The distance (e.g., in meters) may be calculated by dividing the measured round-trip transmission time in units of seconds by two to determine the transmission time in a particular direction, and multiplying the result by the speed of light c, or $3 \times 10^8$ meters per second.

Figure 2:
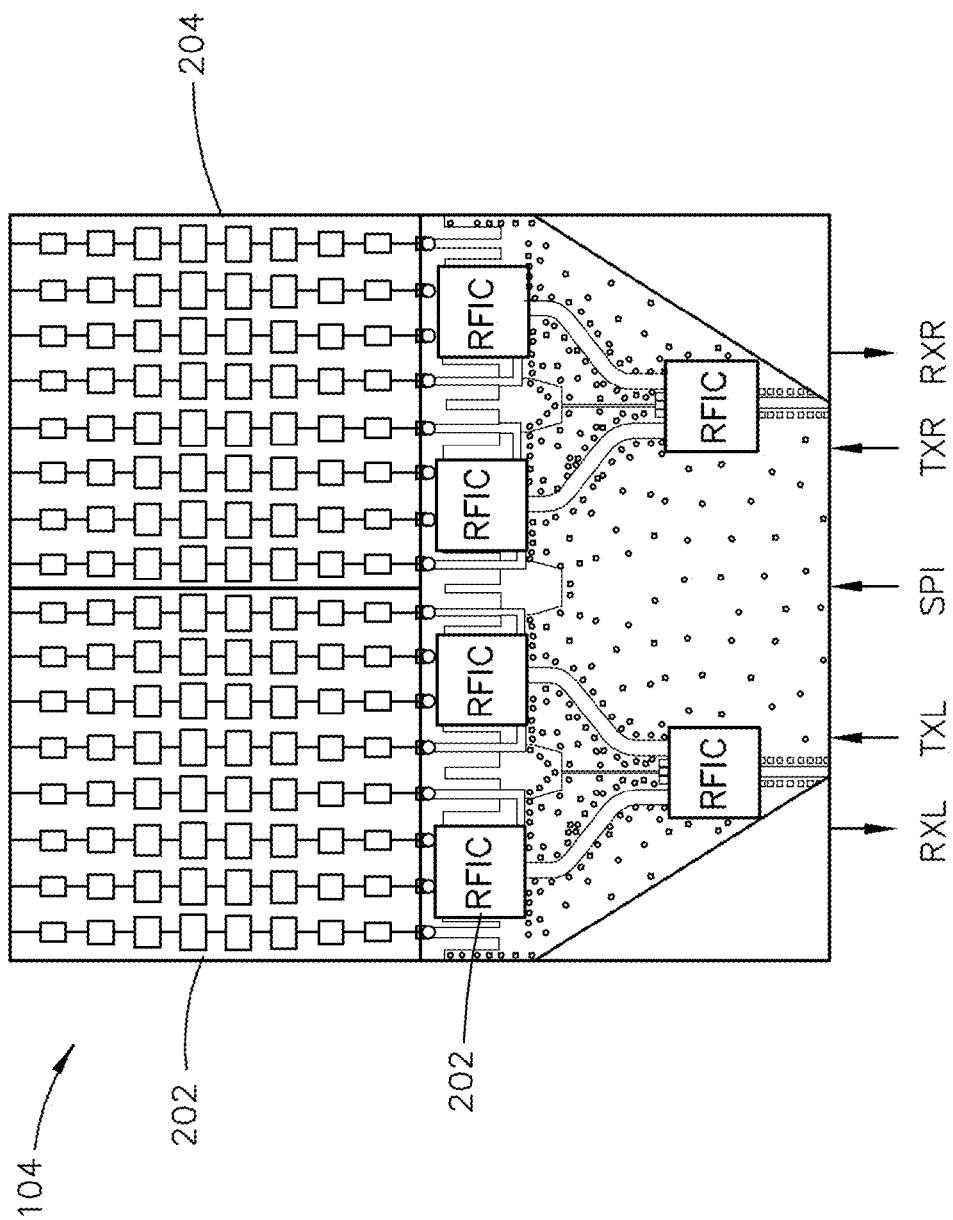
FIG. 2 is a diagram of an antenna assembly associated with a multi-function data link.

Referring now to FIG. 2, the antenna 104 may comprise one or more RFICs 202 mounted on a printed circuit board with patterned conductors to form the antenna elements. The RFICs 202 may include RF receive, transmit, and phase control functions. The RFICs 202 also may include a digital interface such as an SPI bus connection to the processor 140 of FIG. 1 for setting control parameters including the signal phase control for each element in the ESA. In some embodiments, the antenna 104 may be divided into two or more arrays with independent receive paths and common or independent transmit paths. The independent receive paths may each be operatively coupled to receiver signal processing circuits as shown and described in FIG. 1. The separate receive channels may be used to determine the angle of arrival of the received RF transmission by measuring the time difference between the signals received on each channel. The described exemplary configuration may determine the angle of arrival of the received RF transmission in a particular rotational orientation, such as azimuth. A pair of antenna arrays configured in vertical rather than horizontal relationship may determine the angle of arrival of the received RF transmission in the elevation rotational orientation.

Figure 3:
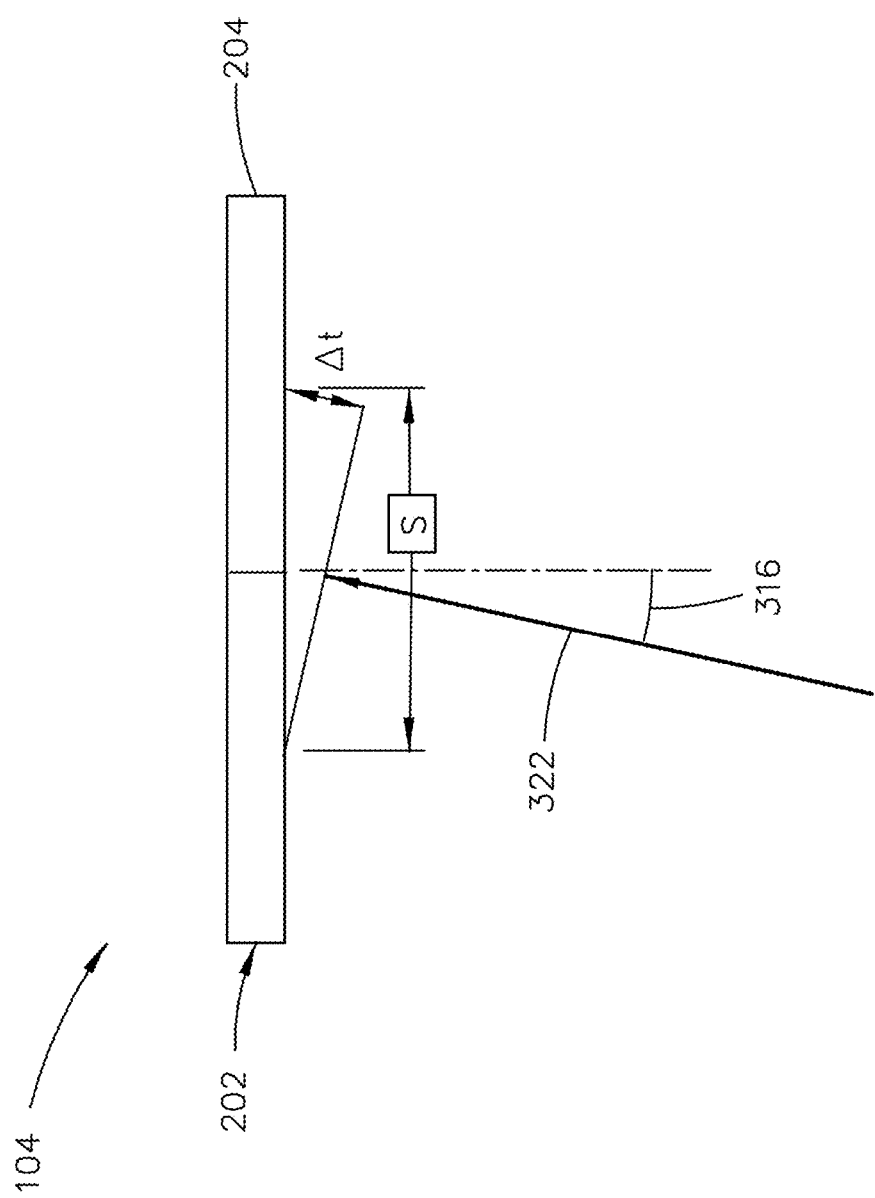
FIG. 3 is a diagram of an antenna assembly configured to determine the angle-of-arrival of a received radio frequency signal.

Referring now to FIG. 3, the angle of arrival measurement provided by the separate arrays of the antenna 104 is illustrated. A particular RF transmission 322 may be received by each array of the antenna 104. In the example of FIG. 3, the array 202 may receive the RF signal before the array 204 by an amount of time Δt. Since the RF signal propagates through space at approximately the speed of light, the difference d in the path lengths between the signal received by the array 202 and the signal received by the array 204 may be determined by multiplying the measured time Δt by the speed of light c, or $3 \times 10^8$ meters per second. The angle of arrival 316 may be calculated by performing the trigonometric calculation:

$$\text{Angle of Arrival} = \arccos(d/s)$$

where s is the physical distance between the phase centers of each of the antenna arrays 202 and 204.

In some cases, the position and orientation of an aircraft is defined by the three translational axes or Cartesian coordinates: x, y, and z, or in georeferenced coordinates: latitude, longitude and elevation; and the three rotational axes: yaw or azimuth, pitch and roll. Determination of the Cartesian coordinates of an object may be accomplished using a GPS receiver. Determination of the rotational orientation of an object in motion such as an aircraft may be accomplished by an inertial measurement unit (IMU) comprising gyros and accelerometers that must be initialized and updated to provide an initial orientation and to correct for drift error associated with the IMU. Miniature gyros and accelerometers used with small UAVs may require updating more often than the larger, more complex IMUs typically associated with large aircraft. One source of earth-referenced rotational orientation information that may be used to update a miniature IMU is a magnetic compass. Another source of rotational orientation information that may be used to update a miniature IMU in a UAV will now be described.

Figure 4:
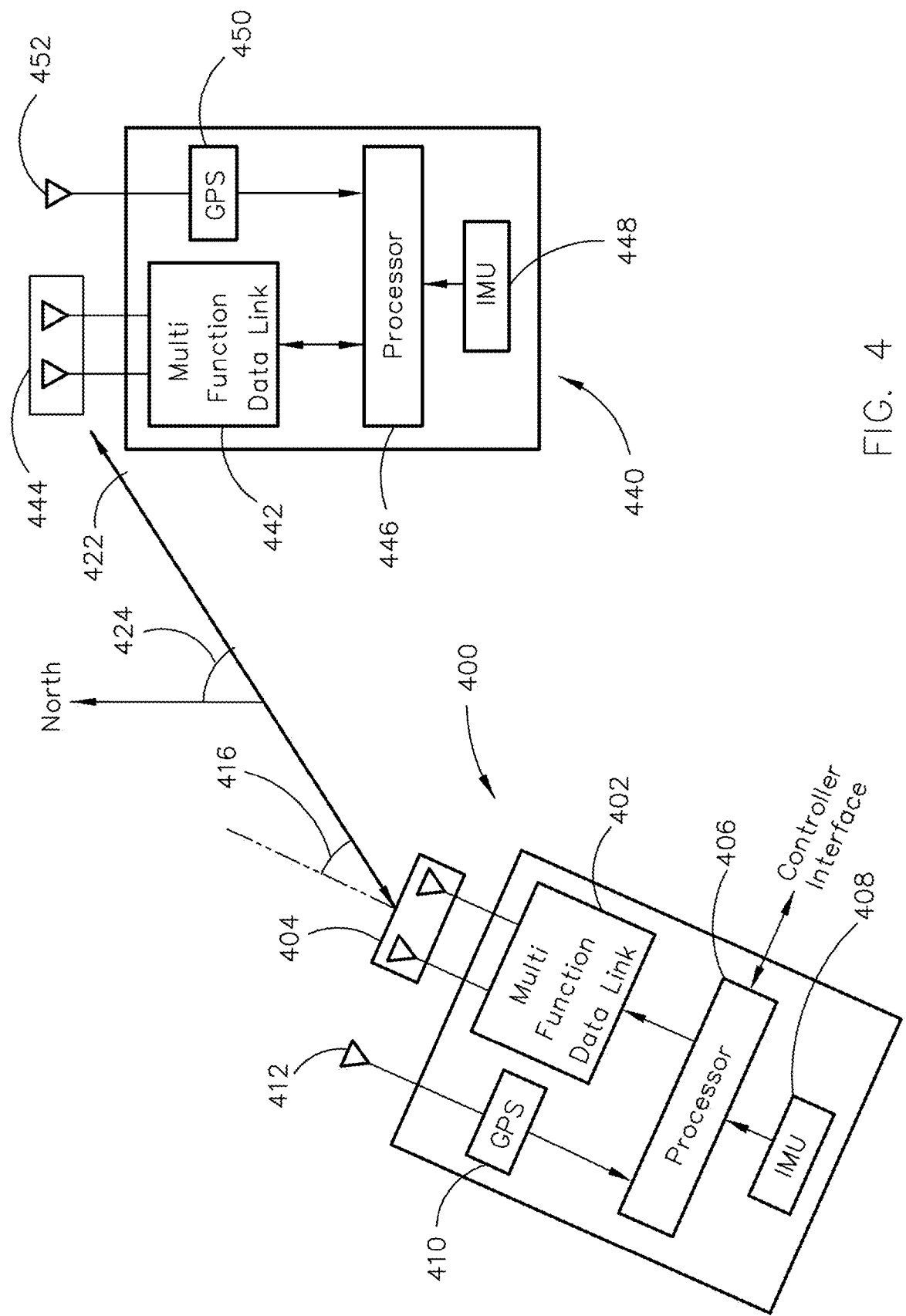
FIG. 4 is a block diagram of an exemplary embodiment of communication and navigation assembly according to the inventive concepts disclosed herein.

Referring now to FIG. 4, an embodiment of a system for the earth-referenced position and rotational orientation of a UAV according to the inventive concepts disclosed herein may include a position and orientation measuring assembly 400 associated with a first UAV 504, and an azimuth baseline transmitter 440 which may be associated with a second UAV 506 operating in communication range of the position and orientation measuring assembly 400 associated with the first UAV 504. The position and orientation measuring assembly 400 may include a global positioning system (GPS) receiver 410 with an antenna 412, a multi-function data link transceiver 402 with a dual antenna 404, an inertial measurement unit (IMU) 408, and a processor 406. An azimuth baseline transmitter 440 may include a GPS receiver 450 with an antenna 452, a multi-function data link transceiver 442 with an antenna 444, and a processor 446.

Still referring to FIG. 4, the azimuth baseline transmitter 440 may communicate with the position and orientation measuring assembly 400 using a data transmission capability of the multi-function data link transceivers 444 and 402 with a line-of-sight radio frequency transmission path 422 between the transceivers 444 and 402. A portion of the data transmitted between the azimuth baseline transmitter 440 and the position and orientation measuring assembly 400 may include differential GPS information that may be used by both receivers to reduce location error artifacts that are common to both receivers. The reduction of the common location error artifacts may enable more accurate determination of the positions of the azimuth baseline transmitter 440 and the position and orientation measuring assembly 400 with respect to one other, which may enable accurate determination of a bearing angle 424 from the position and orientation measuring assembly 400 and the azimuth baseline transmitter 440 with respect to earth-referenced (or georeferenced) true north.

Still referring to FIG. 4, the multi-function data link 402 may be equipped with a dual antenna 404 operatively coupled with dual receivers or separate arrays. By comparing the relative times of the arrival of a single radio frequency transmission 420 on each of the dual receivers, the angle of arrival 416 of the transmission from the remote transceiver 444 may be determined The heading angle of the position and orientation measuring assembly 400, and hence the UAV heading with respect to true North, may be determined by subtracting the angle of arrival measurement 416 from the azimuth baseline angle 424.

Still referring to FIG. 4, the IMU 408 may be configured to provide the primary rotational orientation information for a UAV. The IMU 408 is initialized with initial position and orientation information, and it is subject to drift over time. Once the IMU 408 is initialized, it may maintain a reasonably accurate measure of position and orientation for an amount of time based on the characteristics of the IMU 408. In some embodiments of the inventive concepts disclosed herein, the IMU 408 may be updated periodically by an angle of arrival measurement assembly and an azimuth baseline transmitter assembly.

Figure 5:
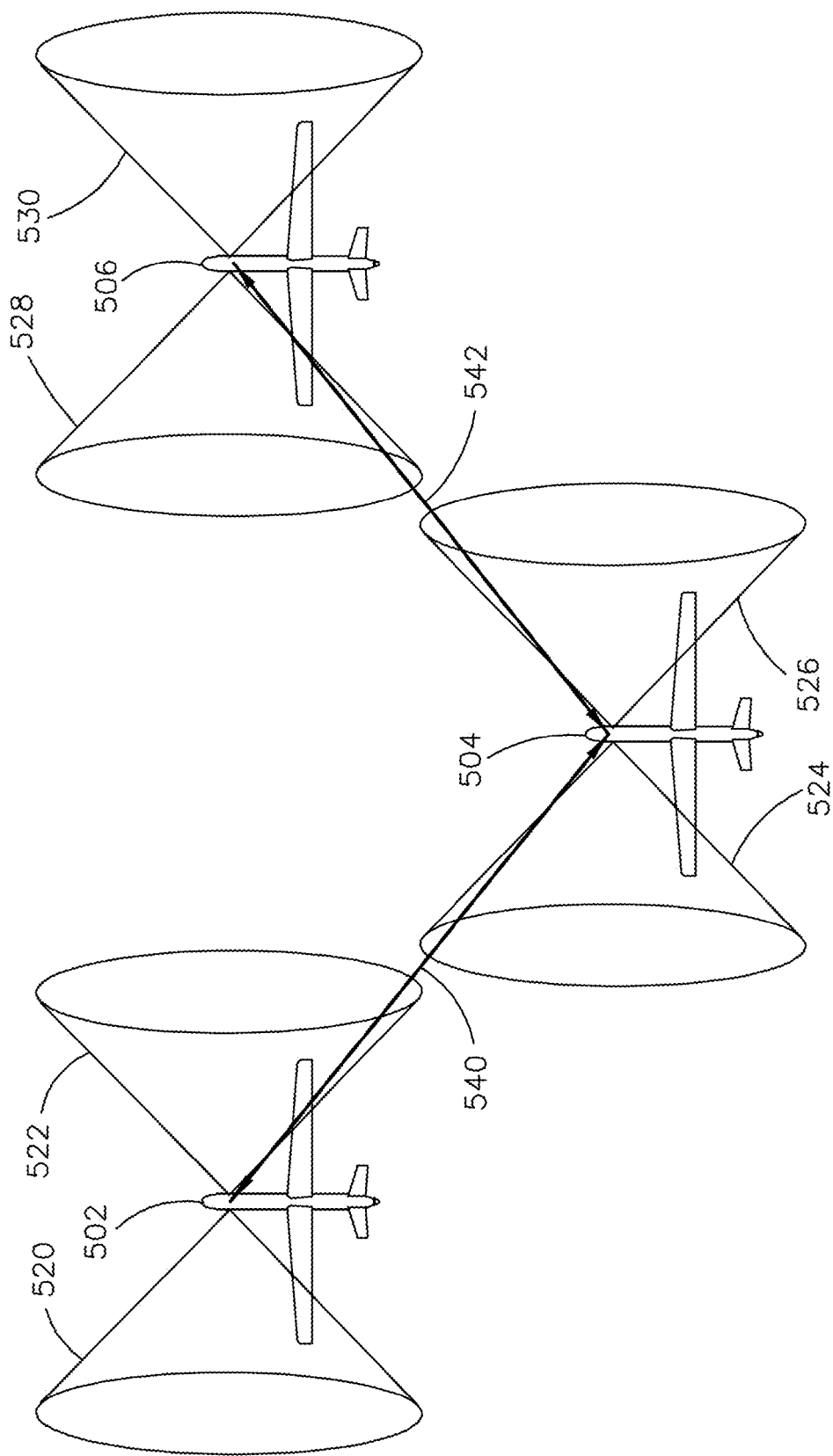
FIG. 5 is a diagram of a group of UAVs configured with a communication and navigation assembly flying in a formation according to the inventive concepts disclosed herein.

Referring now to FIG. 5, an exemplary embodiment of a group or swarm of UAVs 502, 504, and 506 are configured with a communication and navigation assembly according to the inventive concepts disclosed herein. In some embodiments, each UAV 502, 504 or 506 may be configured with two communication and navigation assemblies 400, each pointed in directions where other UAVs in the swarm may be located. In some embodiments, two communication and navigation assemblies 400 may be configured to be directed toward the left and right to communicate with UAVs 502 and 506 flying on the left and right sides of the UAV 504. In the example of FIG. 5, the UAV 504 communicates with the UAV 502 using the left side communication and navigation assembly, and the UAV 504 communicates with the UAV 506 using the right side communication and navigation assembly.

Still referring to FIG. 5, each communication and navigation assembly 400 may include an antenna 404 that may have a propagation pattern within which the RF communication signals are of sufficient strength to communicate, and outside of which the RF communication signals are too weak to communicate. In some embodiments, the UAV 502 may be configured with a left side communication and navigation assembly with a propagation pattern 520 and a right side communication and navigation assembly with a propagation pattern 522. In some embodiments, the propagation patterns 520 and 522 may be conical ellipsoid shapes. In some embodiments, the width of the conical ellipsoid may be on the order of +/−45 degrees. In some embodiments, the height of the conical ellipsoid may be on the order of +/−45 degrees.

Still referring to FIG. 5, the UAV 502 may communicate with the UAV 504 to transmit and receive data along the line of sight vector 540, and may measure the distance from the UAV 502 to the UAV 504 and the angle-of-arrival and the relative orientation between the UAV 502 and the UAV 504. The UAV 504 may communicate with the UAV 506 to transmit and receive data along the line of sight vector 542, and may measure the distance from the UAV 504 to the UAV 506 and the angle-of-arrival and the relative orientation between the UAV 504 and the UAV 506. Each communication and navigation assembly 400 may include a GPS receiver that may determine the georeferenced position of the UAV, and may use the described differential GPS method to determine the georeferenced azimuth orientation of the group of UAVs 502, 504, and 506 flying in formation. If GPS is not available, each UAV may utilize a magnetic compass along with the measured distances between each communication and navigation assembly 400 to determine the georeferenced azimuth orientation of the group of UAVs 502, 504, and 506 flying in formation.

Figure 6:
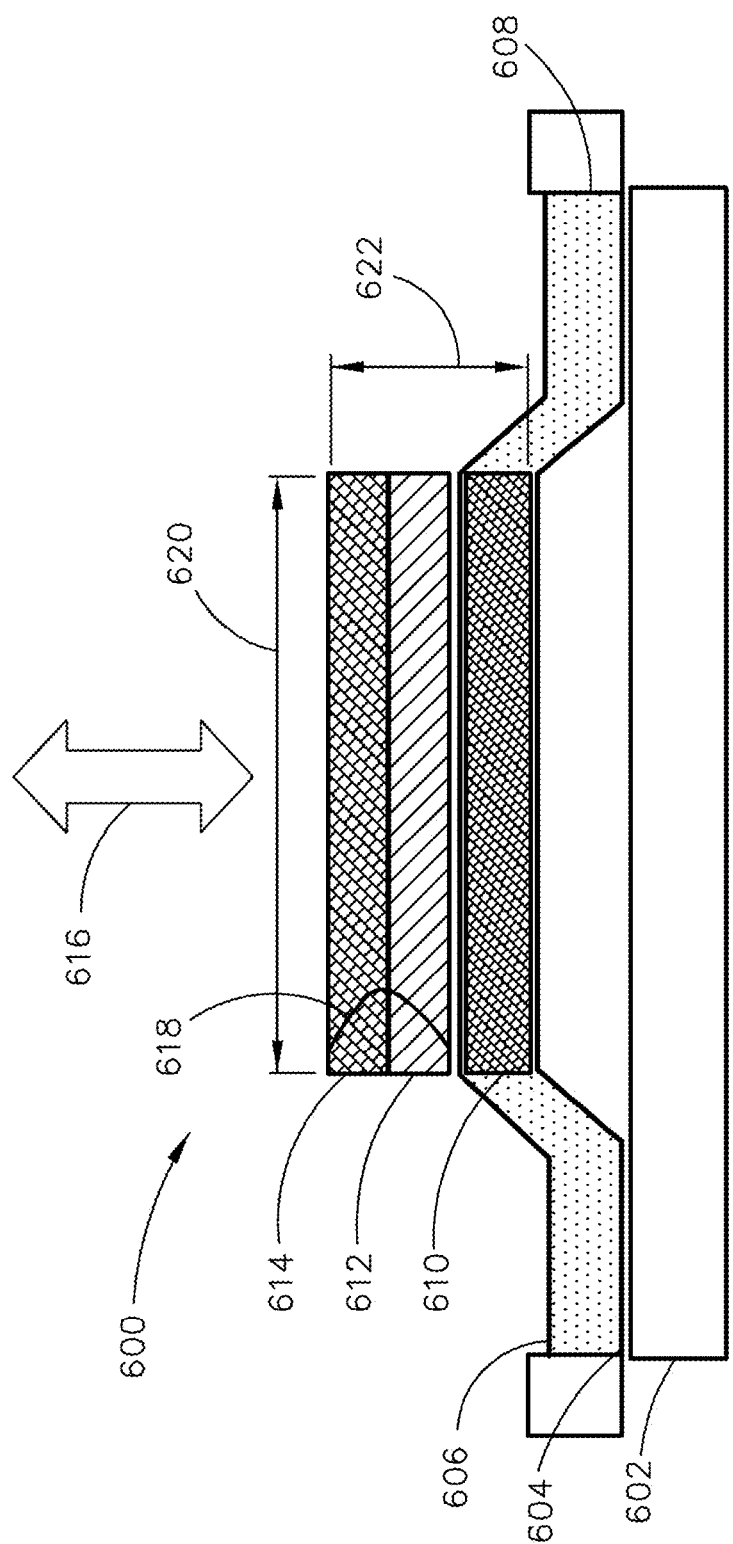
FIG. 6 is a diagram of an embodiment of a radio frequency signal transmitting and receiving element according to the inventive concepts disclosed herein.

Referring now to FIG. 6, an exemplary embodiment of a bidirectional RF transducer 600 according to the inventive concepts disclosed herein is shown. A research publication by Zhi Yao entitled "Bulk Acoustic Wave-Mediated Multiferroic Antennas: Architecture and Performance Bound" in the IEEE TRANSACTIONS ON ANTENNAS AND PROPAGATION, VOL. 63, NO. 8, AUGUST 2015 describes a class of composite multiferroic antennas. In an embodiment, a composite multiferroic bulk acoustic wave-resonance-based antenna may be configured to transmit and receive RF energy.

Still referring to FIG. 6, a substrate 602 may be configured to support the transmitting and receiving elements of the bidirectional RF transducer 600. A conducting layer 604 may be supported by the substrate 602, and may be configured with an area that is not in contact with the substrate 602. A piezo-electric element 610 may be configured to be supported by and operatively coupled with the conducting layer 604, and may further be configured to be located and aligned with the area of the conducting layer 604 that is not in contact with the substrate 602. A non-conducting layer 608 may be configured to be supported by the conducting layer 604 and adjacent to the piezo-electric element 610. A conducting layer 606 may be supported by the piezo-electric element 610 and the non-conducting layer 608, and may be operatively coupled with the piezo-electric element 610.

Still referring to FIG. 6, a magnetostrictive element 612 may be configured to be supported by the conducting layer 606, and may be further configured to be located and aligned with the piezo-electric element 610. A piezo-electric element 614 may be configured to be supported by the magnetostrictive element 612, and may be further configured to be located and aligned with the magnetostrictive element 612. In some embodiments, the piezo-electric elements 610 and 614 may comprise zinc oxide (ZnO), and the magnetostrictive material may comprise yttrium iron garnet (YIG). The thickness of the piezo-electric element 610, the magnetostrictive element 612, and the piezo-electric element 614 may be on the order of 100,000 times shorter than the wavelength of the RF waves 616 that may be transmitted and received by the bidirectional RF transducer 600. For RF waves in the HF band with wavelengths between 10 and 100 meters, the thicknesses of each element 610, 612 and 614 may be between 0.1 and 1.0 millimeters. The combined thickness 622 of elements 610, 612 and 614 may be nominally three times the thickness of each element, or on the order of 0.3 to 3.0 millimeters. In an embodiment, elements 610, 612 and 614 may be generally square in shape, with width and length dimensions 620 approximately the same. The area of the transmitting and receiving portion of bidirectional RF transducer 600 defined by the width times the length may be configured according to the amount of RF power that is to be transmitted by the bidirectional RF transducer 600. In some embodiments, the bidirectional RF transducer 600 may be configured to transmit 100 milliwatts per square millimeter of transmitting assembly area. In an embodiment, a transmitting assembly configured to transmit RF power of 10 watts may have an element area of 100 square millimeters, with width and length dimensions 620 of 10 millimeters.

Still referring to FIG. 6, conductive layers 604 and 606 may be operatively coupled to RF transmitter and receiver assemblies. When the RF transmitter assembly is activated, the piezo-electric element 610 may be electrically driven by electrical signals on the conductive layers 604 and 606, which may excite an acoustic wave 618 that may propagate through the magnetostrictive element 612 and the piezo-electric element 614, and may exit the bidirectional RF transducer 600 as a propagating RF wave 616. When the RF transmitter assembly is not activated, the bidirectional RF transducer 600 may serve as a receiver, where the incident RF wave 616 may impinge upon the piezo-electric element 614 and the magnetostrictive element 612, and may induce an acoustic wave 618 in the materials that may continue toward the piezo-electric element 610. The continuation of the acoustic wave 618 may excite the piezo-electric element 610 to create a voltage across conductors 604 and 606 that may be detected and received by an RF receiver assembly.

Figure 7:
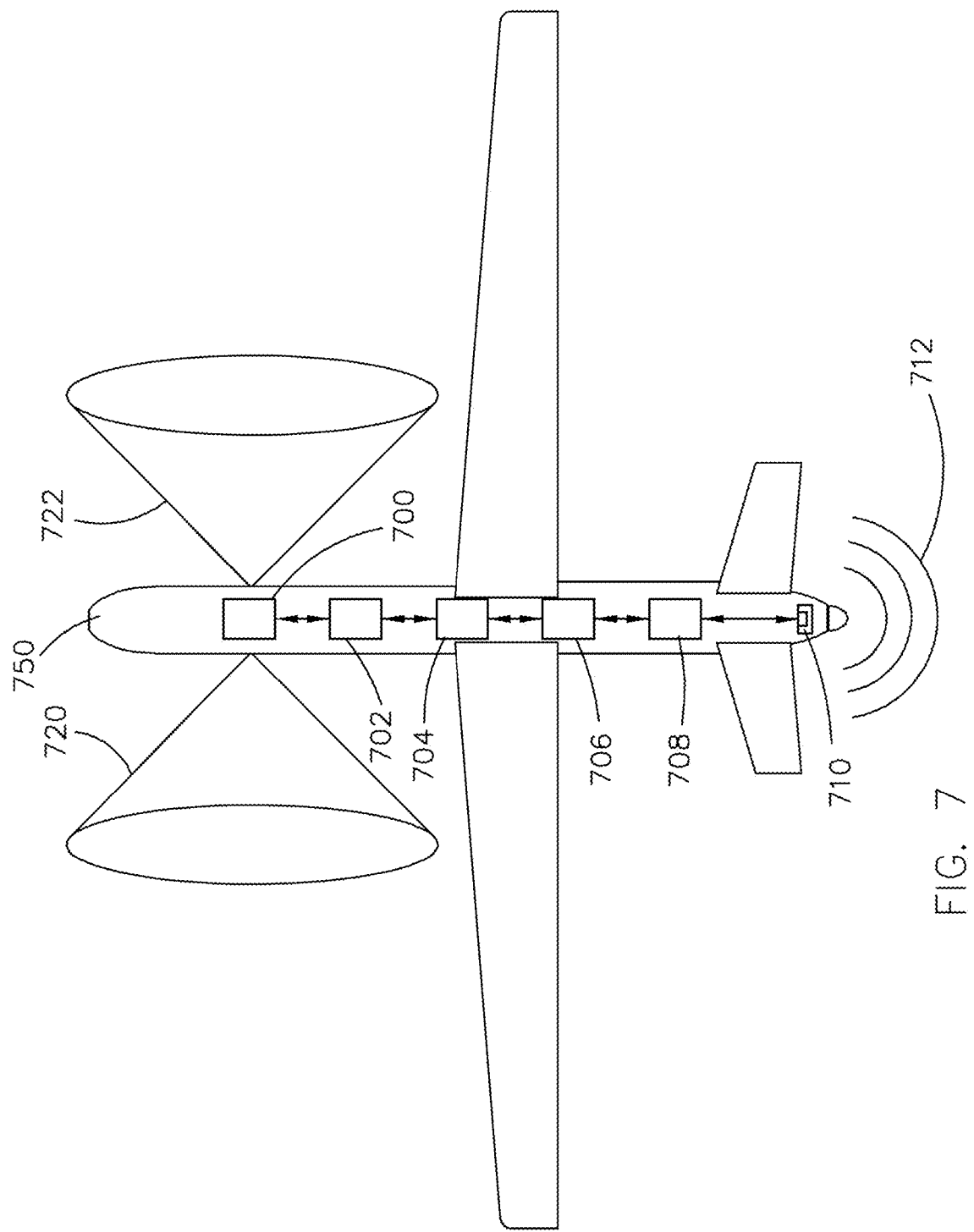
FIG. 7 is a diagram of an exemplary embodiment of a UAV configured with multi-function data link transceiver assemblies and an HF or lower frequency transceiver according to the inventive concepts disclosed herein.

Referring now to FIG. 7, a UAV configured with multi-function data link transceiver assemblies and an HF or lower frequency transceiver according to the inventive concepts disclosed herein is shown. In some embodiments, the UAV 750 may be of size dimensions on the order of a meter in wingspan and length, and may weigh a few kilograms. The UAV 750 may be configured with one or more multi-function data link transceiver assemblies 700 for communication of data with other UAVs, and for determination of position, navigation, time, and the vectors between other UAVs in a group. In some embodiments, the UAV 750 may be configured with two multi-function data link transceiver assemblies with propagation patterns 720 and 722.

Still referring to FIG. 7, the UAV 750 may include an RF transceiver configured for BLOS communication in the HF band to and from a distant communication station. RF communication requires propagation and reception of RF energy through the communication medium, which for terrestrial communications is air. Propagating and receiving RF energy through an air medium may be achieved with an antenna configured to convert electrical energy from current flowing in conductors to waves traveling through the communication medium. Antennas configured for propagating RF energy in the HF communication band are typically much larger than a meter in length, and are too large to be used with a small UAV.

Still referring to FIG. 7, an HF communication assembly may include a bidirectional RF transducer 710 operable in the HF band, a transmitter and receiver assembly 708, a time or phase delay assembly 706, a signal processor assembly 704, a communication processor 702, and one or more multi-function data link transceiver assemblies 700. The multi-function data link transceiver assemblies may communicate with other UAVs operating within proximity of the UAV 750, and may accurately measure the distance and location angles of the other UAVs 750. The distance and location angle measurements may be used to determine the three-dimensional locations of all of the UAVs 750 with respect to each other. The GPS receivers in the multi-function transceivers 700 may be configured to determine the georeferenced positions of the UAVs 750, which may be used to determine the georeferenced orientation of the group of UAVs 750. If GPS is not available, the georeferenced positions of the UAVs 750 and a magnetic compass may be used to determine the georeferenced orientation of the group of UAVs 750.

Still referring to FIG. 7, the accurate determination of the three-dimensional location of the each UAV 750 in the swarm or group makes it possible to control the direction of flight of each UAV 750 so that the group of UAVs may be generally arranged in a desired formation. The actual positions of each UAV 750 may be different from the commanded location due to the effects of atmospheric and other flying conditions on the trajectory of the UAV 750. The multi-function transceivers 700 may determine the actual position of each UAV 750 with high accuracy and precision. Using the accurate and precise position of each UAV 750 in the group along with the time reference provided by the multi-function transceivers 700, a calculation may be performed by the communication processor 702 and/or the signal processor 704 to determine the phase or time delay value to be associated with the time or phase delay assembly 706 to cause the RF transmission from the transmitter and receiver assembly 708 through the bidirectional RF transducer 710 to be configured in relationship to other UAVs 750 in the group. This calculation may be performed by a computing resource on a single designated control UAV 750, or it may performed in a distributed computing manner using the multi-function data link transceivers and computing resources on two or more of the UAVs 750 in the swarm or group.

Still referring to FIG. 7, the relative positions of each UAV 750 may vary during communication by the group of UAVs 750 to the distant communication station due to the effects of atmospheric and other flying conditions on the trajectory of the UAV 750. The rate of determination and communication of the actual position of each UAV 750 may be much higher than the rate of communication by the group of UAVs 750 to the distant communication station. Modification of the phase or time delay value to be associated with the time or phase delay assembly 706 may be made at the rate of the determination and communication of the actual locations of each UAV 750 to maintain relatively constant direction of the propagation pattern of the RF transmissions to and from the distant communication station.

Figure 8:
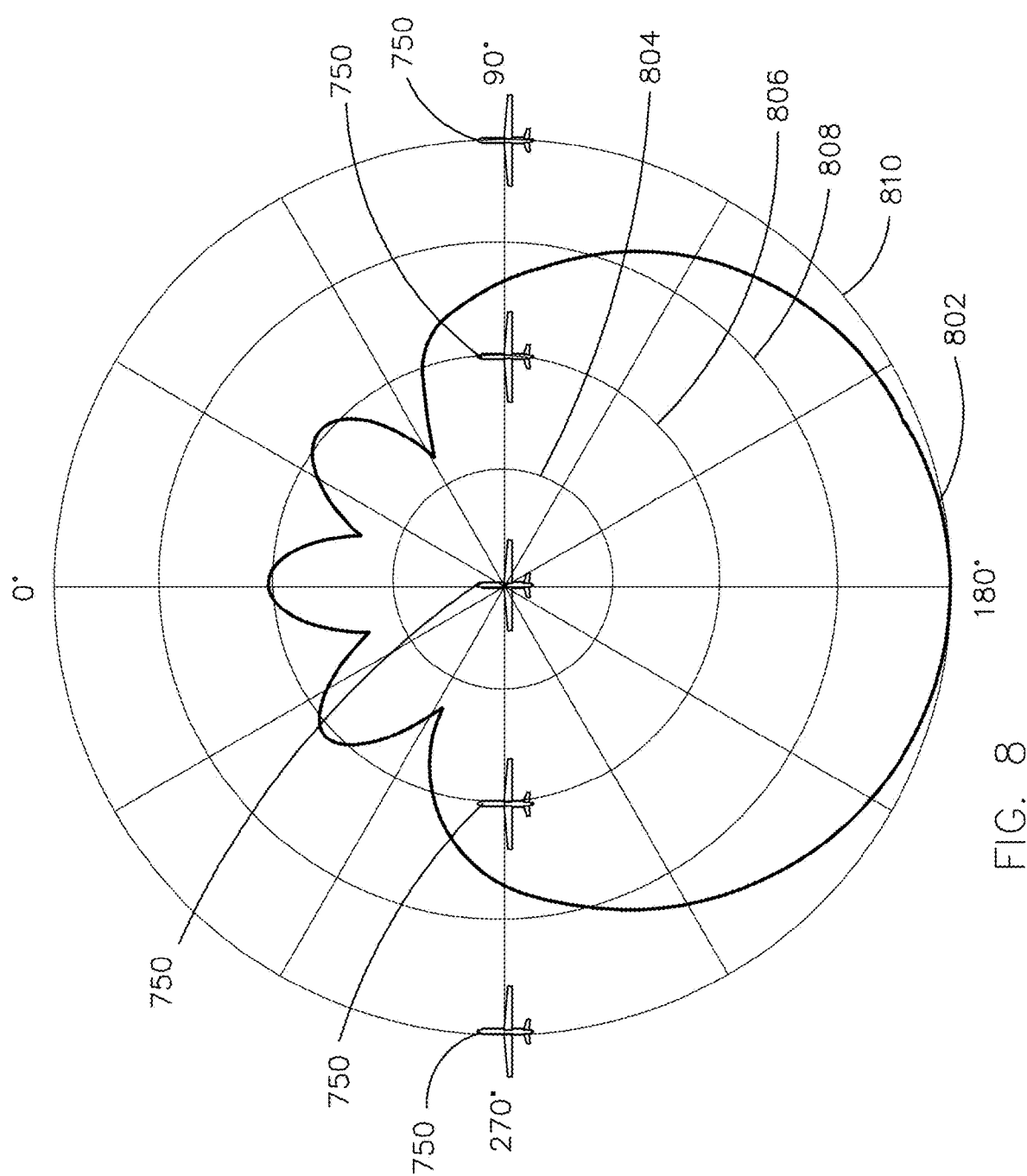
FIG. 8 is a diagram of a relative strength and azimuth direction of transmitted and received RF communication signals associated with a group of UAVs flying in formation according to the inventive concepts disclosed herein.

Referring now to FIG. 8, a group of UAVs flying in a predetermined formation is shown according to the inventive concepts disclosed herein. In some embodiments, a plurality of UAVs 750 may be configured to fly in a formation of a line, with spacing between the UAVs 750 being less than the HF wavelength divided by 2. At an HF transmitting frequency of 30 MHz, the wavelength is 10 meters, and the spacing between the UAVs 750 may be less than 5 meters. At a HF transmitting frequency of 3 MHz, the wavelength is 100 meters, and the spacing between the UAVs 750 may be less than 50 meters. The spacing between the UAVs 750 may be proportionally greater if the transmitting frequency is lower.

Still referring FIG. 8, the plurality of UAVs 750 flying in a predetermined formation may transmit and receive HF communications according to a propagation pattern 802. The circles 804, 806, 808 and 810 represent antenna gain amounts in decibels (dB). In some embodiments, the values of the antenna gain associated with circles 804, 806, 808 and 810 may be 2.5, 5, 7.5 and 10 dB respectively. The directionality of the propagation pattern is indicated by the notations 0°, 90°, 180°, and 270° in relation to the orientation of the group of UAVs 750. In some embodiments, the propagation pattern may be directed in a selected azimuthal direction to enable communication with a distant station from the group of UAVs 750. The selection of the azimuthal direction may be an input to the calculation performed by the communication processor 702 and/or the signal processor 704 to determine the phase or time delay value to be associated with the time or phase delay assembly 706 of FIG. 7. Each UAV 750 may be configured to operate as an element in a virtual electronically steerable array (ESA). The effective antenna gain of the virtual ESA may be a function of the number of UAVs 750 in the group and the accuracy and precision of the determination of the time or phase delay associated with each UAV 750. In some embodiments, 10 UAVs 750 may be configured to fly in a formation of a row transverse to the direction of flight, with spacing between the UAVs 750 of approximately 5 meters. In some embodiments, each transmitter and receiver assembly 708 may be configured to transmit 5 watts of RF power through the bidirectional RF transducer 710 in a transmit mode. The total aggregated transmit power may be 10 times 5 watts or 50 watts. The antenna gain may be 10 dB in the 180° direction, which represents a factor of 10 times increase. The effective radiated power from the group of UAVs 750 may be 10 times 50 watts or 500 watts in the 180° or rear oriented direction.

Still referring to FIG. 8, the propagation pattern of the virtual ESA may be configured to have reduced gain in a selected direction. In some embodiments, the effect of an external interfering transmitter may be reduced by controlling the phase or time delay value associated with the time or phase delay assembly 706 of FIG. 7 to cause a null, or relatively low gain propagation pattern in the direction of the external interfering transmitter. In some embodiments, the direction of the external interfering transmitter may be determined by sequentially directing a null in the propagation pattern of the virtual ESA in all directions and determining the relative strength of the signal from the external interfering transmitter. In some embodiments, the virtual ESA may be configured to direct a high gain propagation pattern toward a distant communication station, while simultaneously directing a low gain propagation pattern toward an external interfering transmitter.

Still referring to FIG. 8, in some embodiments, the swarm or group of UAVs 750 may use GPS to determine the location and georeferenced orientation of the swarm or group. In some embodiments where GPS is not available, the swarm or group of UAVs 750 may change the direction of the propagation pattern of the virtual ESA to establish and maintain communication with the distant station, and may use signal strength information from the distant station to maintain approximate navigational orientation of the group or swarm of UAVs 750. In some embodiments where GPS is not available, the azimuthal orientation of the swarm or group of UAVs 750 may be determined by the use of one or more magnetic compass sensors that may sense the earth's magnetic field.

Figure 9:
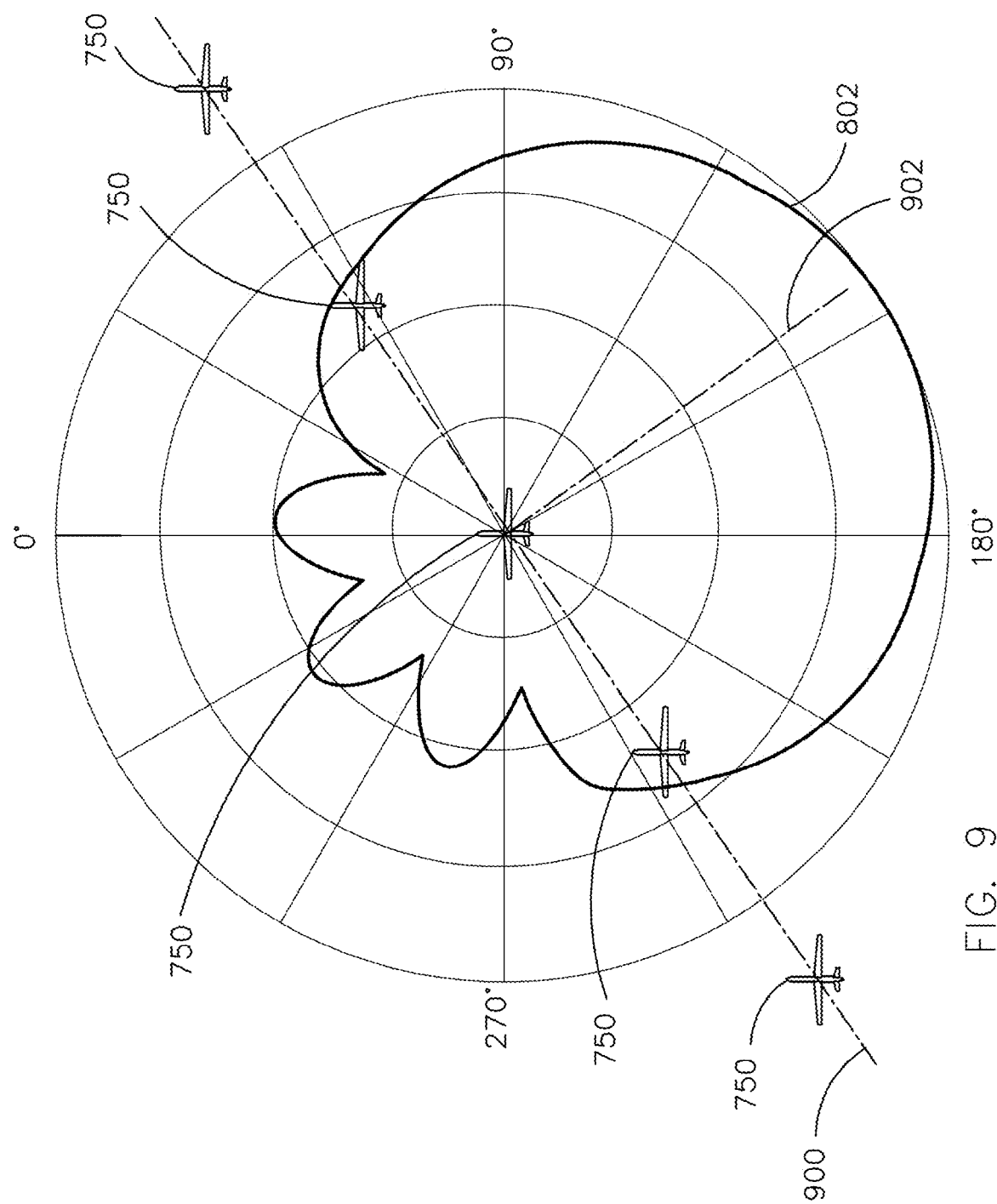
FIG. 9 is a diagram of a relative strength and azimuth direction of transmitted and received RF communication signals associated with a group of UAVs flying in an alternate formation according to the inventive concepts disclosed herein.

Referring now to FIG. 9, a group of UAVs 750 flying in a predetermined formation is shown according to the inventive concepts disclosed herein. In an embodiment, a plurality of UAVs 750 may be configured to fly in a formation along a line 900 oriented at an angle that is not perpendicular with the direction of travel of the group of UAVs 750, with spacing between the UAVs 750 being less than the HF wavelength divided by 2. The plurality of UAVs 750 flying in a predetermined formation may transmit and receive HF communications according to a propagation pattern 802 that may have maximum gain at an angle 902. The propagation pattern associated with the group of UAVs 750 may be configured to be directed in a predetermined direction by a combination of the formation of the group of UAVs 750 and the calculation of the phase or time delay associated with each UAV 750.

Still referring to FIG. 9, the examples shown are described in two-dimensional terms for the sake of clarity and understanding. The plurality of UAVs 750 may be configured to fly in a predetermined three-dimensional formation. In some embodiments, the group or swarm of UAVs 750 may fly in an arbitrary three-dimensional formation with relatively close spacing between the UAVs 750. In some embodiments, at least one of the aircraft may be a traditional aircraft manned by a pilot. The group or swarm of UAVs 750 may be configured to fly along with and accompany the one or more piloted aircraft, and may support the objectives of the piloted aircraft with the resources provided by the group or swarm of UAVs 750. The piloted aircraft may serve as a controller or master that commands the modes of operation of the group or swarm of UAVs.

Figure 10:
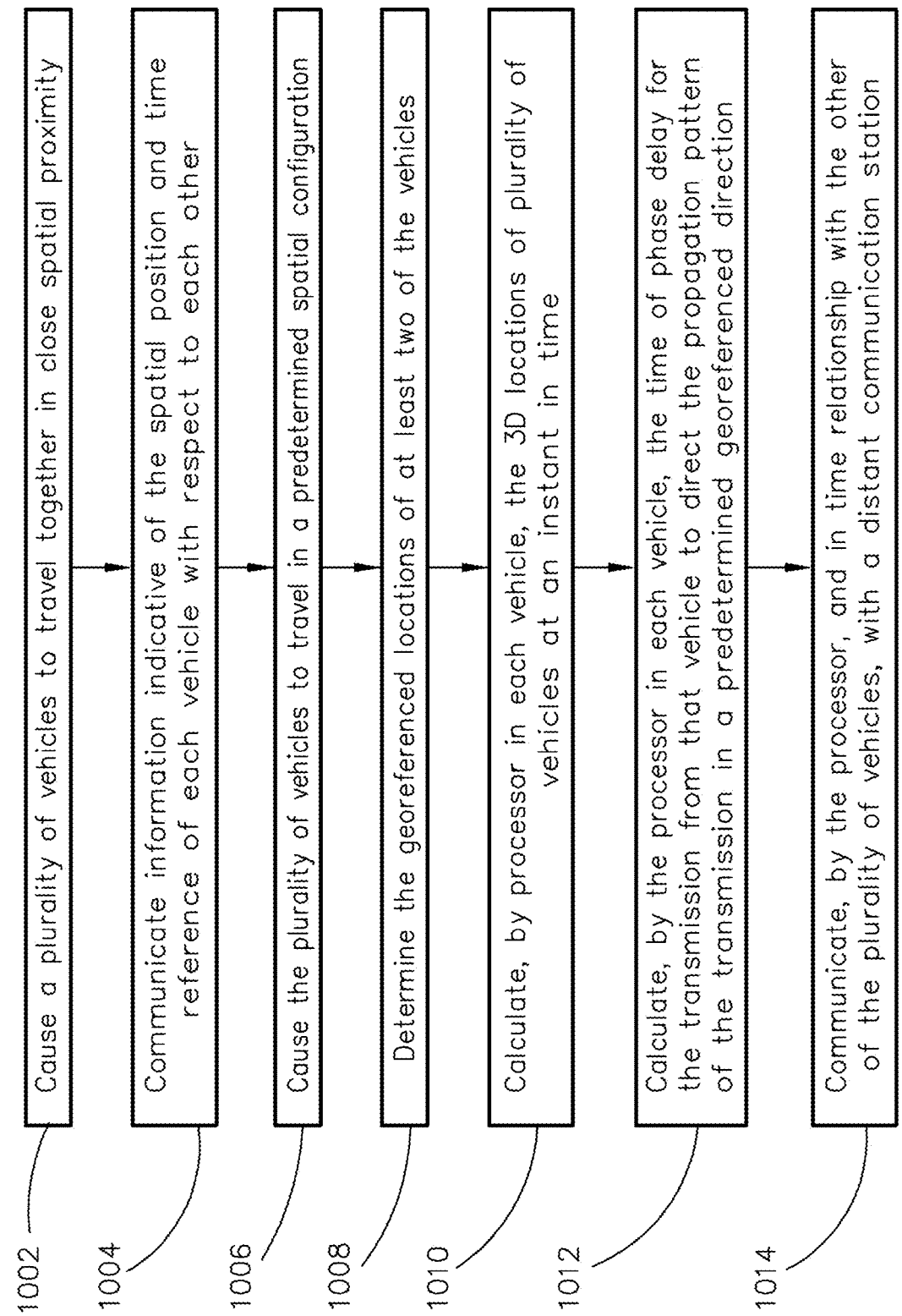
FIG. 10 is diagram of an exemplary embodiment of a method for providing beyond line-of-sight communication with a group of UAVs flying in formation.

Referring now to FIG. 10, an exemplary embodiment of a method according to the inventive concepts disclosed herein may include one or more of the following steps.

In a step 1002, a plurality of vehicles may be configured to travel together in proximity to one another.

In a step 1004, a first communication system may be configured to have a communication transceiver associated with each of the plurality of vehicles, and may communicate information indicative of the spatial position and time reference of each vehicle with respect to each other.

In a step 1006, a processor may be associated with each of the plurality of vehicles, and executing processor-executable code stored in a non-transitory processor-readable medium, may access the information indicative of the spatial position and time reference of each vehicle with respect to each other, and may cause each of the vehicles to travel in a predetermined spatial configuration.

In a step 1008, a processor may be associated with at least two of vehicles, and executing processor-executable code stored in a non-transitory processor-readable medium, may access information indicative of the georeferenced positions of the two vehicles.

In a step 1010, a processor may be associated with each of the plurality of vehicles, and executing processor-executable code stored in a non-transitory processor-readable medium, may access information indicative of the relative and georeferenced positions of the vehicles, and may calculate the three-dimensional locations of each of the plurality of vehicles at an instant in time.

In a step 1012, a processor may be associated with each of the plurality of vehicles, and executing processor-executable code stored in a non-transitory processor-readable medium, may calculate the time or phase delay relative to the time reference for the transmission from that vehicle to direct the propagation pattern of the transmission in a predetermined georeferenced direction.

In a step 1014, a processor may be associated with each of the plurality of vehicles, and executing processor-executable code stored in a non-transitory processor-readable medium, may be configured to operate in time relationship with the other of the plurality of vehicles to communicate with a distant communication station.

As will be appreciated from the above, the communication system and method according to embodiments of the inventive concepts disclosed herein may provide beyond long distance line-of-sight communications for a group of small unmanned aerial vehicles.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for communicating information, comprising:
   a plurality of vehicles, comprising:
   a first vehicle comprising at least one first communication transceiver including at least one first dual antenna element configured to transmit and receive radio frequency signals in a millimeter-wave frequency band, a first high frequency communication assembly including a first bidirectional radio frequency transducer configured to transmit and receive radio frequency signals in a high frequency band, at least one GPS receiver configured to determine a georeferenced position of the first vehicle, and at least one first processor operatively coupled to the at least one first communication transceiver, the at least one first dual antenna element, the first bidirectional radio frequency transducer, and the at least one GPS receiver, and to a first non-transitory processor-readable medium storing processor-executable code for causing the at least one first processor to control the at least one first communication transceiver for communicating on a first communication network and control the at least one first bidirectional radio frequency transducer element for communicating over a second communication network; and at least one second vehicle comprising at least one second communication transceiver including at least one second dual antenna element configured to transmit and receive radio frequency signals in the millimeter-wave frequency band, a second high frequency communication assembly including a second bidirectional radio frequency transducer configured to transmit and receive radio frequency signals in the high frequency band, at least one second GPS receiver configured to determine a georeferenced position of the at least one second vehicle, and at least one second processor operatively coupled to the at least one second communication transceiver, the at least one second dual antenna element, the second bidirectional radio frequency transducer, the at least one second GPS receiver, and to a second non-transitory processor-readable medium storing processor-executable code for causing the at least one second processor to control the at least one second communication transceiver for communicating on the first communication network and control the second bidirectional radio frequency transducer for communicating over the second communication network;
   wherein the first and the at least one second vehicles are configured to communicate with one another over the first communication network to determine the relative georeferenced position of each of the first and at least one second vehicles, and to provide time synchronization between the first and at least one second vehicles, and to cooperate with one another so as to form a virtual electrically steerable antenna configured to communicate between the plurality of vehicles and a beyond line of site location via the second communication network.

2. The communication system of claim 1, wherein the non-transitory processor-readable medium storing processor-executable code further causes the at least one processor associated with the first vehicle to access the first communication network, receive from the first communication network information indicative of the relative position of the at least one second vehicle, and calculate the three-dimensional positions of the first and the at least one second vehicles.

3. The communication system of claim 2, wherein;
   the calculated three-dimensional positions of the first and at least one second vehicles are compared to three-dimensional positions representing a predetermined spatial orientation of the first and at least one second vehicles; and
   the differences between the calculated three-dimensional positions of the first and at least one second vehicles and the predetermined spatial orientation of the first and at least one second vehicles are used to change a direction of motion of the first and at least one second vehicles.

4. The communication system of claim 2, wherein the three-dimensional location of each of the first and at least one second vehicles is communicated by the first communication network to each vehicle.

5. The communication system of claim 4, wherein radio frequency transmissions on the second communication network are based on the calculated three-dimensional position of each of the first and at least one second vehicles and the time synchronization from the first communication network.

6. The communication system of claim 5, wherein the radio frequency transmissions on the second communication network are configured to change during transmission on the second communication network.

7. The communication system of claim 6, wherein the radio frequency transmissions on the second communication network are configured to change from a first direction of transmission to a second direction of transmission.

8. The communication system of claim 6, wherein the radio frequency transmissions on the second communication network are configured to reduce the gain of the propagation in at least one direction.

9. A system for communicating information, comprising:
   a plurality of vehicles, comprising:
   a first vehicle comprising at least one first communication transceiver including at least one first dual antenna element configured to transmit and receive radio frequency signals in a millimeter-wave frequency band, a first high frequency communication assembly including a first bidirectional radio frequency transducer configured to transmit and receive radio frequency signals in a high frequency band, and at least one first processor operatively coupled to the at least one first communication transceiver, the at least one first dual antenna element, the first bidirectional radio frequency transducer, and a first non-transitory processor-readable medium storing processor-executable code for causing the at least one first processor to control the at least one first communication transceiver for communicating on a first communication network and control the first bidirectional radio frequency transducer for communicating on a second communication network;

and at least one second vehicle comprising at least one second communication transceiver including at least one second dual antenna element configured to transmit and receive radio frequency signals in the millimeter-wave frequency band, a second high frequency communication assembly including a second bidirectional radio frequency transducer configured to transmit and receive radio frequency signals in the high frequency band, and at least one second processor operatively coupled to the at least one second communication transceiver, the at least one second antenna element, and a second non-transitory processor-readable medium storing processor-executable code for causing the at least one second processor to control the at least one second communication transceiver for communicating on the first communication network and control the second bidirectional radio frequency transducer for communicating over the second communication network;

wherein the first and the at least one second vehicles are configured to communicate with one another over the first communication network to determine the relative position of each of the first and at least one second vehicles, and to provide time synchronization between the first and at least one second vehicles, and to cooperate with one another so as to form a virtual electrically steerable antenna configured to communicate between the plurality of vehicles and a beyond line of sight location via the second communication network.

10. The communication system of claim 9, wherein the non-transitory processor-readable medium storing processor-executable code further causes the at least one processor associated with the first vehicle to access the first communication network, receive from the first communication network information indicative of the relative position of the at least one second vehicle, and calculate the three-dimensional positions of the first and the at least one second vehicles.

11. The communication system of claim 10, wherein;
the calculated three-dimensional positions of the first and at least one second vehicles are compared to three-dimensional positions representing a predetermined spatial orientation of the first and at least one second vehicles; and
the differences between the calculated three-dimensional positions of the first and at least one second vehicles and the predetermined spatial orientation of the first and at least one second vehicles are used to change a direction of motion of the first and at least one second vehicles.

12. The communication system of claim 10, wherein the three-dimensional location of each of the first and at least one second vehicles is communicated by the first communication network to each vehicle.

13. The communication system of claim 12, wherein radio frequency transmissions on the second communication network are based on the calculated three-dimensional position of each of the first and at least one second vehicles and the time synchronization from the first communication network.

14. The communication system of claim 13, wherein the radio frequency transmissions on the second communication network are configured to change during transmission on the second communication network.

15. The communication system of claim 14, wherein the radio frequency transmissions on the second communication network are configured to change from a first direction of transmission to a second direction of transmission.

16. The communication system of claim 14, wherein the radio frequency transmissions on the second communication network are configured to reduce the gain of the propagation in at least one direction.

17. A method of communicating with a plurality of moving vehicles, comprising:
causing the vehicles to travel in close spatial proximity;
communicating information indicative of a spatial position and a time reference of each vehicle with respect to the vehicles by a communication transceiver on each vehicle, the communication transceiver including a dual antenna configured to transmit and receive radio frequency signals in a millimeter-wave frequency band;
causing the vehicles to travel together in a predetermined spatial configuration;
accessing information indicative of the georeferenced positions of at least two of the vehicles;
accessing, by a processor associated with each of the plurality of vehicles, and executing processor-executable code stored in a non-transitory processor-readable medium, information indicative of the relative and georeferenced positions of the vehicles;
calculating, by the processor in each vehicle, the three-dimensional locations of each of the plurality of vehicles at an instant in time;
calculating, by the processor in each vehicle, the time or phase delay for a transmission from a bidirectional radio frequency transducer in that vehicle to direct a propagation pattern of the transmission in a predetermined georeferenced direction over a high frequency band; and
communicating, by the processor in each vehicle configured to operate in time relationship with the other of the plurality of vehicles, with a beyond line of sight communication station by the transmission from the bidirectional radio frequency transducer.

18. The method of claim 17, whereby the time or phase delay for the transmission from each vehicle to direct the propagation pattern of the transmission is configured to change during transmission on the second communication network.

19. The method of claim 17, whereby the time or phase delay for the transmission from each vehicle to direct the propagation pattern of the transmission is configured to change from a first direction of transmission to a second direction of transmission on the second communication network.

20. The method of claim 17, whereby the time or phase delay for the transmission from each vehicle to direct the propagation pattern of the transmission is configured to reduce the gain of the propagation in at least one direction.

* * * * *